(12) United States Patent  (10) Patent No.: US 7,146,998 B2
Nirasawa et al.  (45) Date of Patent: Dec. 12, 2006

(54) HYDRAULIC VALVE

(75) Inventors: Hideo Nirasawa, Wako (JP); Keisuke Ito, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 341 days.

(21) Appl. No.: 10/451,639

(22) PCT Filed: Nov. 8, 2002

(86) PCT No.: PCT/JP02/11681

§ 371 (c)(1),
(2), (4) Date: Jul. 10, 2003

(87) PCT Pub. No.: WO03/040599

PCT Pub. Date: May 15, 2003

(65) Prior Publication Data

US 2004/0089355 A1  May 13, 2004

(30) Foreign Application Priority Data

Nov. 9, 2001  (JP)  .............................. 2001-345254

(51) Int. Cl.
G05D 11/00  (2006.01)
(52) U.S. Cl. ............................ 137/115.18; 137/118.06; 137/625.69
(58) Field of Classification Search .......... 137/625.69, 137/118.06, 115.26, 115.18
See application file for complete search history.

(56) References Cited

U.S. PATENT DOCUMENTS

| 2,239,148 A | * | 4/1941 | Ernst ..................... 137/115.26 |
| 3,563,272 A | * | 2/1971 | Mercier ................. 137/625.69 |
| 3,895,703 A | * | 7/1975 | Schmitt et al. ........ 137/625.69 |
| 4,014,360 A | * | 3/1977 | Adams .................. 137/118.06 |
| 4,325,400 A | * | 4/1982 | Wynne .................. 137/118.06 |
| 4,556,078 A | * | 12/1985 | Wittren ................. 137/118.06 |
| 4,646,786 A | * | 3/1987 | Herder et al. .......... 137/625.69 |
| 5,058,626 A | * | 10/1991 | Takaoka et al. ....... 137/625.69 |
| 5,758,683 A | * | 6/1998 | Cook ..................... 137/115.26 |
| 5,762,134 A | * | 6/1998 | Droste et al. .......... 137/115.26 |
| 6,079,694 A | * | 6/2000 | Yoshida ................. 137/625.69 |
| 6,389,809 B1 | | 5/2002 | Niidome et al. |

FOREIGN PATENT DOCUMENTS

| DE | 20 39 932 A1 | 2/1971 |
| EP | 0 851 160 A | 7/1998 |
| GB | 1 411 505 A | 10/1975 |
| JP | 54-69431 | 5/1979 |
| JP | 58-61381 | 4/1983 |

(Continued)

*Primary Examiner*—John Rivell
(74) *Attorney, Agent, or Firm*—Westerman, Hattori, Daniels & Adrian, LLP.

(57) ABSTRACT

A stepped down groove 53 is provided around the peripheral surface of a rod portion 43 of a spool 40 which faces a third oil groove 33. Both the axial ends 53a and 53b of the stepped down groove 53 are located axially outside of both the axial ends 33a and 33b of the third oil groove 33 at least while the valve is in pressure-adjusting condition. Also, another stepped down groove 52 is provided around a land 42 which faces a first oil groove 31. Both the axial ends 52a and 52b of the stepped down groove 52 come, respectively, to the right and left sides of the axial end 31b of the first oil groove 31 to which end the spool 40 shifts to increase the opening of the oil groove at least while the valve is in pressure-adjusting condition.

7 Claims, 8 Drawing Sheets

FOREIGN PATENT DOCUMENTS

| | | |
|---|---|---|
| JP | 1-150265 | 10/1989 |
| JP | 3-38524 | 8/1991 |
| JP | 5-60250 | 3/1993 |
| JP | 7-63275 | 3/1995 |
| JP | 2522273 | 1/1997 |
| JP | 2001-55968 | 2/2001 |
| JP | 2001-116158 | 4/2001 |
| JP | 2001-295946 | 10/2001 |

* cited by examiner

Figure 9:
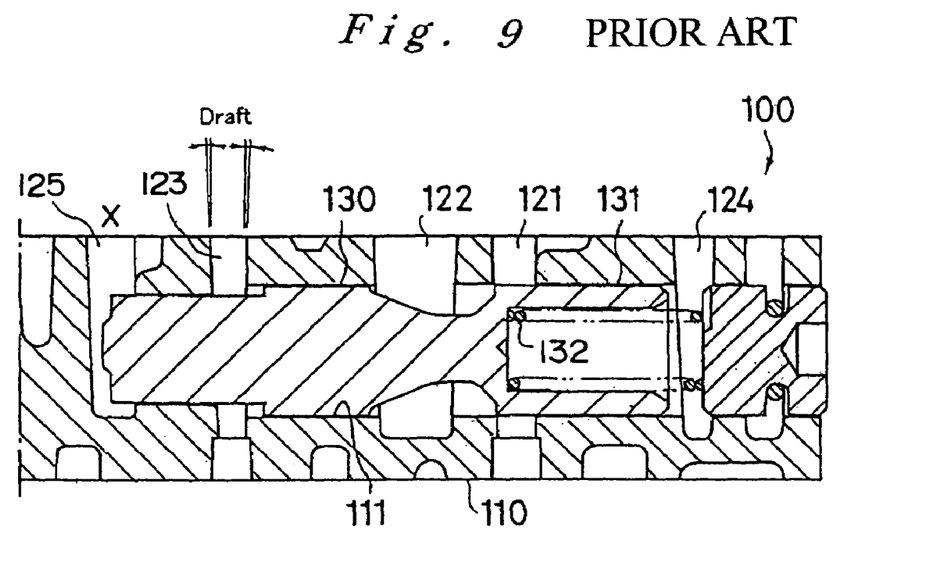
FIG. 9 shows a prior-art hydraulic valve.

HYDRAULIC VALVE
>
> ## TECHNICAL FIELD OF THE INVENTION
>
> The present invention relates to a hydraulic valve which comprises a valve body, in which a spool-receiving room is provided to receive a spool being inserted therein.
>
> ## BACKGROUND OF THE INVENTION
>
> A typical slide-type hydraulic valve comprises a valve body and a spool, which is accommodated and movable axially in a cylindrical spool-receiving room (also referred to as "bore") provided in the valve body. The valve body is provided additionally with a plurality of oil grooves, which are formed perpendicularly to the central axis of the spool-receiving room, and with oil passages, which are provided extending from these oil grooves, to allow passage of hydraulic fluid or oil through the valve. Furthermore, the spool comprises lands, which function as seals against flow of oil, and passages, which function as passageways for flow of oil. In this construction of the hydraulic valve, the spool is shifted axially in the spool-receiving room to change the positions of the lands and passages of the spool with respect to the oil grooves of the valve body, so that an intended result can be achieved, for example, a change in the pressure or a change in the rate of oil flow through an oil passage. For shifting the position of the spool, the spool is connected to a lever, which can be manually operated, or it is equipped with an appropriate device so that the hydraulic valve is operated hydraulically or electromagnetically in consideration of the condition where the hydraulic valve is to be applied.
>
> FIG. 9 shows a regulator valve 100 as an example of such hydraulic valve. The valve body 110 of the regulator valve 100 includes a cylindrical spool-receiving room 111. The central part of the spool-receiving room 111 is connected to a first oil groove 121, which lead to a main oil passage (not shown), where oil pressurized by a hydraulic pump (not shown) and adjusted by the regulator valve 100 is delivered. On the left side of the first oil groove 121, a second oil groove 122 is provided to connect to a lubrication oil passage (not shown). In this arrangement; although the spool 130 is biased leftward by a spring 132 provided on the right side of the valve, if the pressure of the main oil passage is fed back through a third oil groove 123, which is provided on the left side of the valve, the spool 130 can shift rightward overcoming the biasing force of the spring 132. Moreover, a fourth oil groove 124 is provided on the right side of the spool-receiving room 111. When a control pressure is supplied into the fourth oil groove 124, this pressure generates a leftward biasing force on the spool 130 additionally to that of the spring 132. In addition, a fifth oil groove 125 provided on the left side of the third oil groove 123 is connected to a drain oil passage.
>
> A land 131, which is provided at the central portion of the spool 130, is positioned in the first oil groove 121. When the leftward biasing force by the spring 132, the rightward biasing force generated by the pressure supplied in the third oil groove 123, and the rightward biasing force generated by the pressure supplied in the fourth oil groove 124 to set the regulator valve pressure, all these forces acting on the spool 130, are in equilibrium, the first oil groove 121 is in fluid communication with the second oil groove 122. In this condition, part of the oil being discharged from the hydraulic pump is led to the lubrication oil passage to maintain the pressure of the main oil passage at a constant pressure (line pressure).
>
> By the way, the valve body 110 of the regulator valve 100 is an article of cast metal produced by die casting, so each of the first oil groove 121, second oil groove 122, third oil groove 123 and fourth oil groove 124 has a draft or slight taper, which is used for facilitating the removal of the die assembly during the production. Because of the presence of a draft, the length of each oil groove in the direction of the axis of the spool 130 is smaller for the part of the oil groove located deeper in the valve body (part located lower in the drawing of FIG. 9) and larger for the part located shallower. Therefore, the force acting around the spool 130 (for example, the force acting on the peripheral surface of the land 131 in a direction perpendicular to the axis of the spool 130) is stronger when the hydraulic pressure is received at a position shallower in each of the oil grooves. As a result, an unbalanced load is generated in a direction from the shallower part to the deeper part of the valve body over the peripheral surface of the spool 130, and this unbalanced load not only disturbs the smooth movement of the spool 130 (hydraulic lock) but also erodes the valve body 110. Furthermore, the unbalanced load can cause a misalignment of the spool 130 in the spool-receiving room 111, and this misalignment, in turn, increases the amount of oil leak.
>
> For alleviating the adverse effects of the unbalanced load acting on the spool, one method is to provide a labyrinth groove on the peripheral surface of the spool. However, forming such a labyrinth groove requires a number of man-hours, and this method no way eliminates the unbalanced load itself. Therefore, the effectiveness of this method is limited. Another method is to grind the inner surfaces of the oil grooves to remove the drafts or slight tapers, which are created during the molding of the oil grooves. However, this method also requires a number of man-hours and increases the production cost substantially.
>
> On this background, it is an object of the present invention to provide a hydraulic valve that maintains the smooth movement of the spool with little erosion of the valve body. This hydraulic valve should eliminate possibility of an unbalanced load to act on the spool, with a low cost, not requiring provision of a labyrinth groove or grinding of the inner surfaces of oil grooves.
>
> ## DISCLOSURE OF THE INVENTION
>
> To achieve the above objective, a hydraulic valve as a first embodiment according to the present invention comprises a valve body and a spool, the valve body having a cylindrical spool-receiving room and an oil groove (for example, the third oil groove 33 described in the following embodiment) provided orthogonally to the axis of the spool-receiving room. The spool is inserted in the spool-receiving room, so that the spool is shifted axially in correspondence to an actuation pressure supplied into the oil groove. In this hydraulic valve, a stepped down groove is provided around the peripheral surface of the spool which faces the oil groove (for example, the peripheral surface of the rod portion 43 of the spool 40 described in the following embodiment), such that both the axial ends of the stepped down groove are located, respectively, axially outside of both the axial ends of the oil groove at least while the hydraulic valve is in pressure-adjusting condition.
>
> In this hydraulic valve, because a stepped down groove is provided around the peripheral surface of the spool which faces the oil groove, oil in the oil groove flows into the stepped down groove and pushes the peripheral surface in the direction perpendicular to the axis of the spool. Furthermore, because both the axial ends of the stepped down groove are located axially outside of both the axial ends of the oil groove at least while the hydraulic valve is in pressure-adjusting condition, the pushing force acting on the peripheral surface of the stepped down groove is distributed evenly all around the peripheral surface. Therefore, no unbalanced force is generated around the peripheral surface, so the movement of the spool is smoother than that of a prior-art counterpart. In this favorable condition, no or little unbalanced load acts to push the spool onto the valve body, so the valve body is less prone to erosion than a prior-art counterpart.

A hydraulic valve as a second embodiment according to the present invention comprises a valve body and a spool, the valve body having a cylindrical spool-receiving room and an oil groove (for example, the first oil groove 31 described in the following embodiment) provided orthogonally to the axis of the spool-receiving room. The spool is inserted in the spool-receiving room, so that the spool is shifted axially to change the axial length of the part of a land (for example, the land 42 described in the following embodiment) facing the oil groove so as to adjust the opening of the oil groove. In this hydraulic valve, a stepped down groove is provided around the peripheral surface of the land so that both the axial ends of the stepped down groove come axially to the right and left sides, respectively, of the axial end of the oil groove toward which end the spool shifts to increase the opening at least while the valve is in pressure-adjusting condition.

In this hydraulic valve, because a stepped down groove is provided around the peripheral surface of the land of the spool facing the oil groove, oil in the oil groove flows into the stepped down groove and pushes the peripheral surface in the direction perpendicular to the axis of the spool. In this instance, because both the axial ends of the stepped down groove come axially to the right and left sides, respectively, of the axial end of the oil groove to which end the spool shifts to increase the opening of the oil groove at least while the valve is in pressure-adjusting condition, the pushing force acting on the peripheral surface of the stepped down groove is distributed evenly all around the peripheral surface. Therefore, no unbalanced force is generated to act around the peripheral surface, so the movement of the spool is smoother than that of a prior-art counterpart. In addition, the valve body is less prone to erosion than a prior-art counterpart because no or little unbalanced load acts to push the spool onto the valve body.

A hydraulic valve as a third embodiment according to the present invention comprises a valve body and a spool, the valve body having a cylindrical spool-receiving room and an oil groove provided orthogonally to the axis of the spool-receiving room. The spool is inserted in the spool-receiving room, so that the spool is shifted axially to switch positions so as to set the oil groove into fluid communication and into blockage in correspondence to the respective switched positions. In this hydraulic valve, a stepped down groove is provided around the peripheral surface of a land of the spool, so that the stepped down groove faces the oil groove when the spool is positioned at each switched position. Furthermore, an axial end of the stepped down groove is located axially outside of the oil groove notwithstanding the switched position of the spool.

In this hydraulic valve, because a stepped down groove is provided around the peripheral surface of the land of the spool facing the oil groove when the spool is positioned at each switched position, oil in the oil groove flows into the stepped down groove and pushes the peripheral surface in the direction perpendicular to the axis of the spool. In this instance, because an axial end of the stepped down groove comes axially outside of the oil groove when the spool is at any switched position, the pushing force acting on the peripheral surface of the stepped down groove is distributed evenly all around the peripheral surface. Therefore, no unbalanced force is generated around the peripheral surface, so the movement of the spool is smoother than that of a prior-art counterpart. In addition, the valve body is less prone to erosion than a prior-art counterpart because no or little unbalanced load acts to push the spool onto the valve body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

THE BEST-MODE EMBODIMENTS OF THE INVENTION

Figure 1:
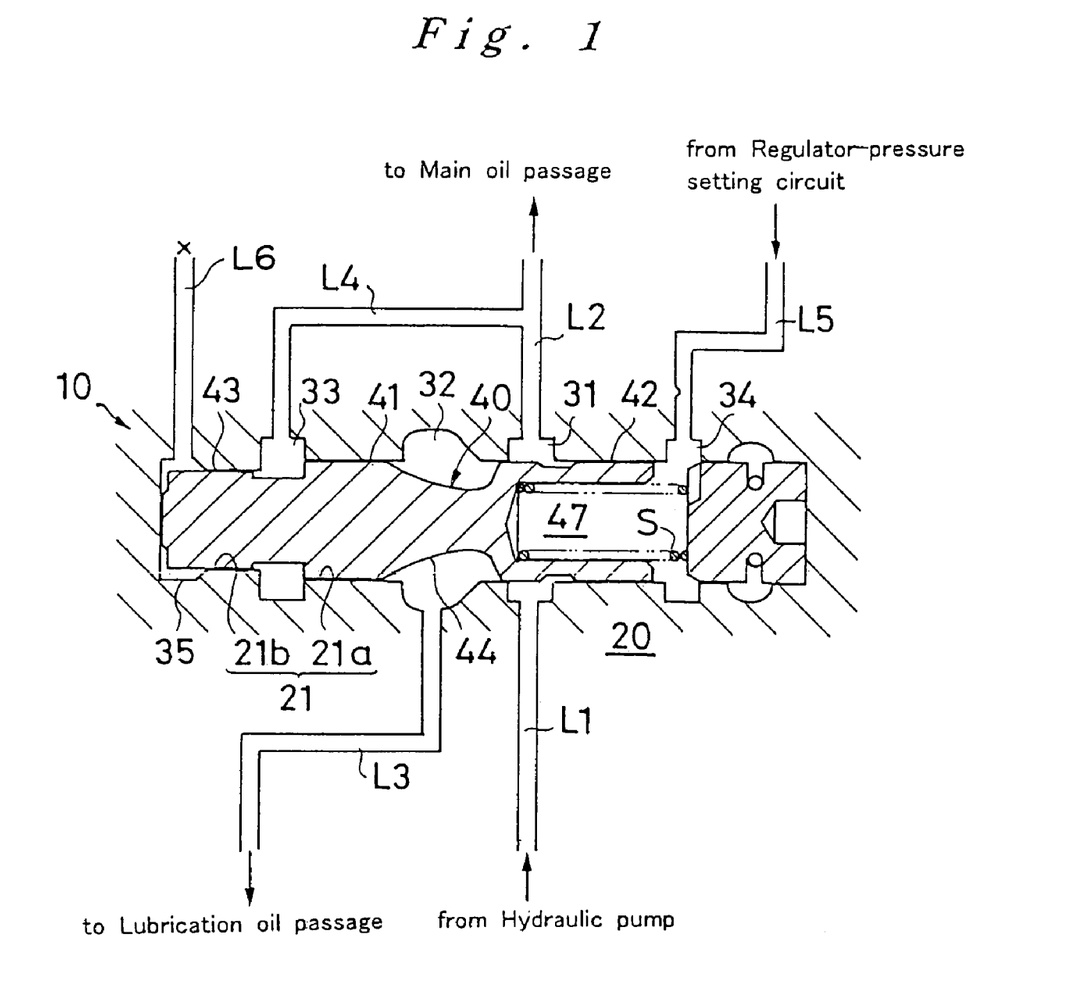
FIG. 1 shows, along with adjacent oil passages, a hydraulic valve according to the present invention as first and second embodiments being applied as a regulator valve used for a vehicular transmission.
Figure 2:
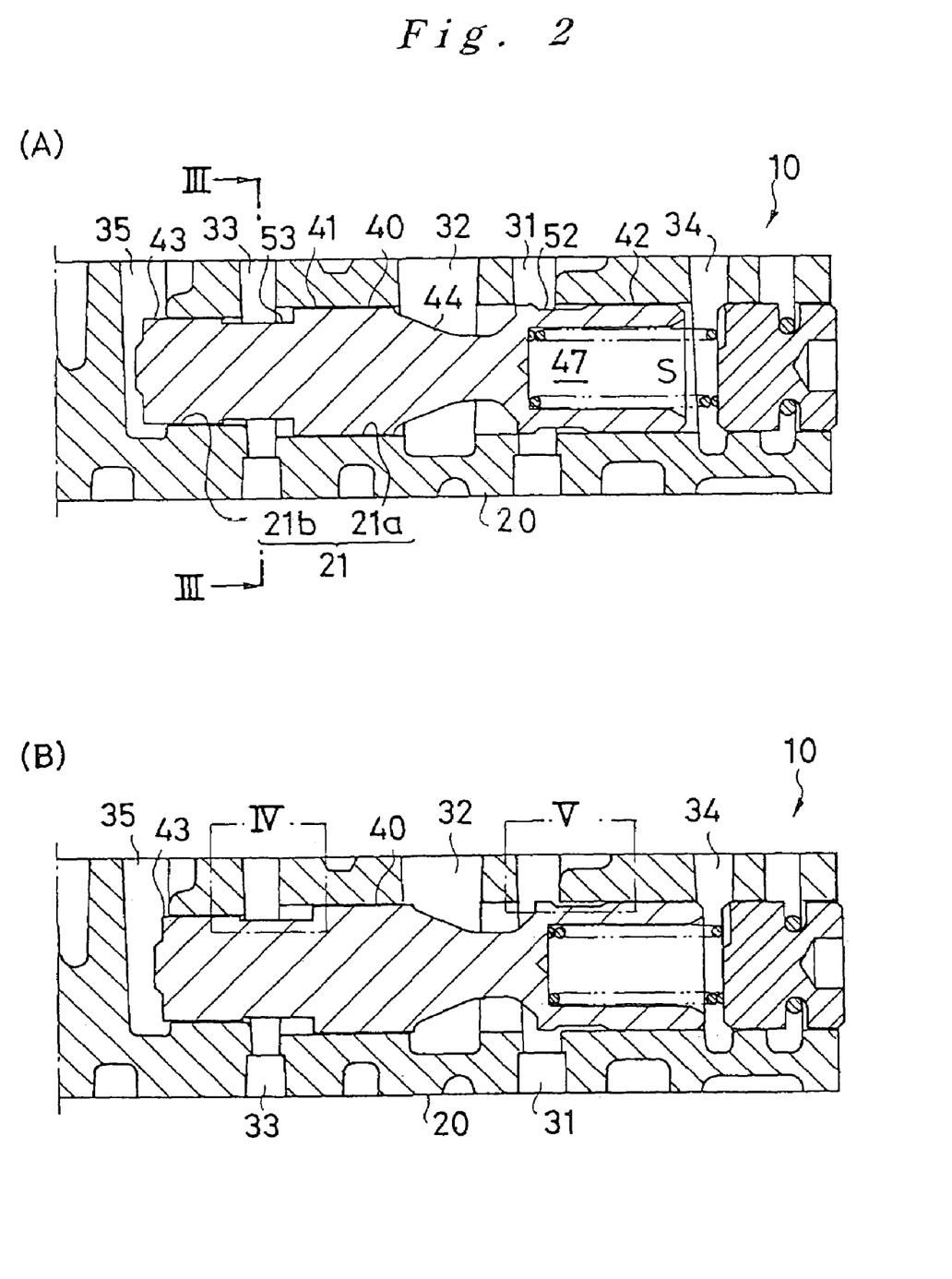
FIGS. 2A and 2B are enlarged views of the regulator valve shown in FIG. 1, FIG. 2A showing the condition of the valve where the spool is shifted a little rightward from its leftmost position, and FIG. 2B showing the condition where the spool is shifted further rightward.
Figure 3:
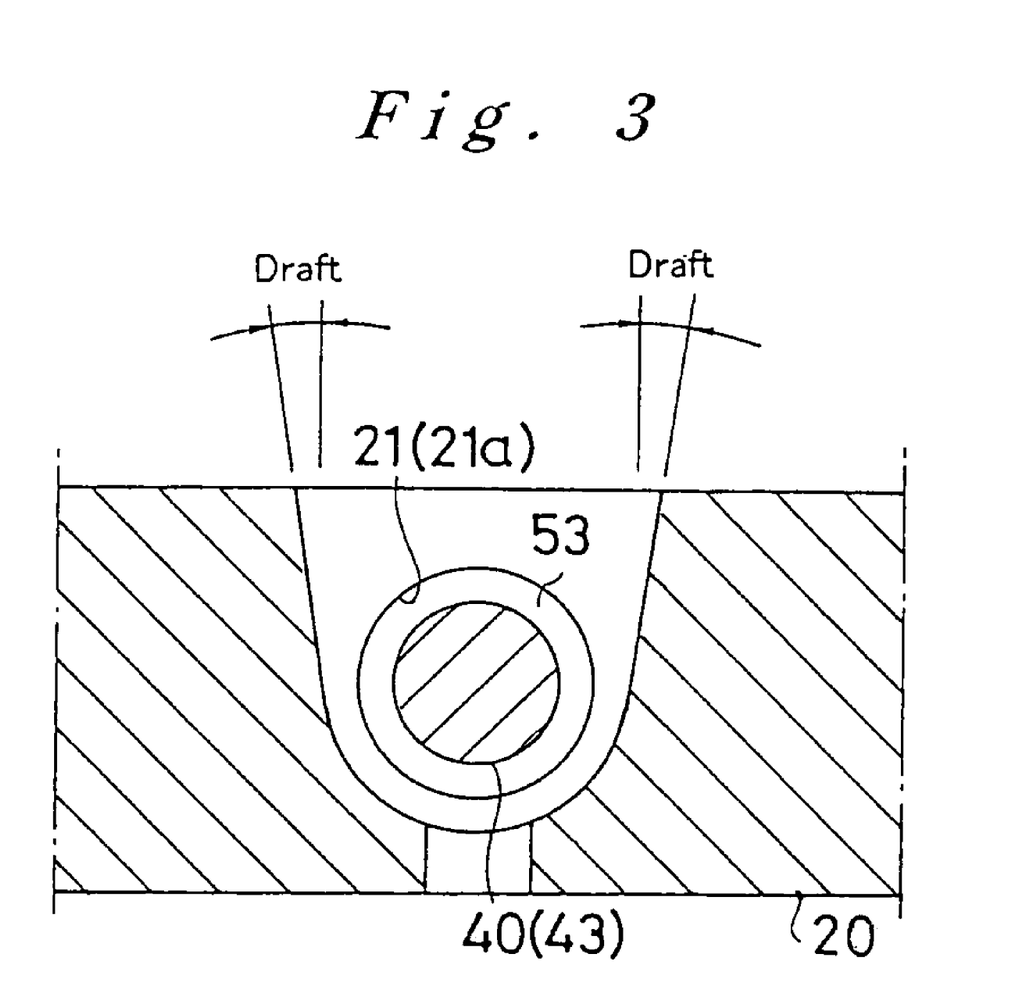
FIG. 3 is a sectional view taken along line III—III in FIG. 2A.
Figure 4:
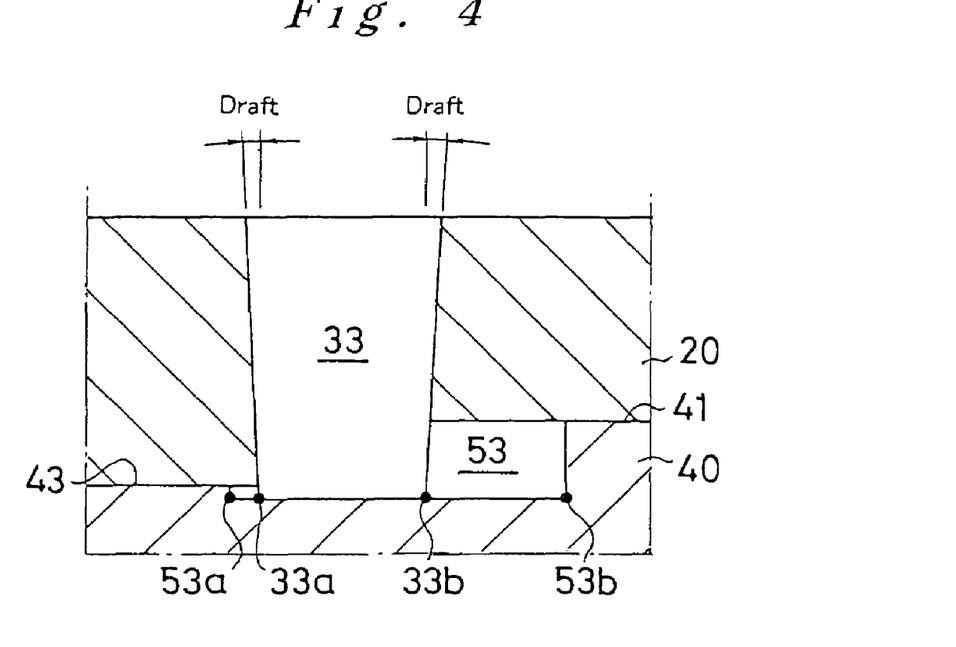
FIG. 4 is an enlarged view of area IV in FIG. 2B.
Figure 5:
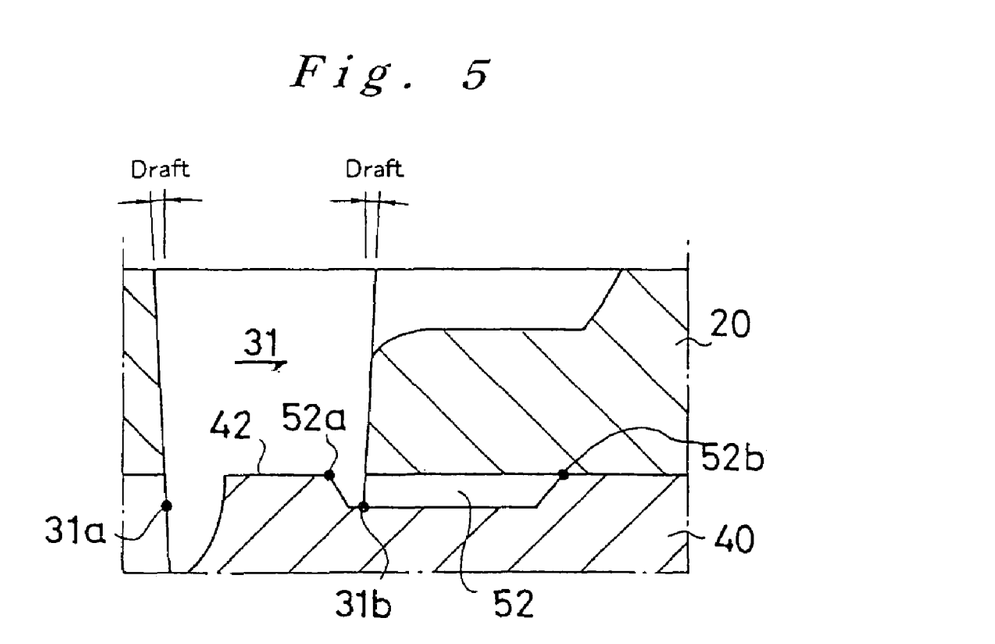
FIG. 5 is an enlarged view of area V in FIG. 2B.

Now, preferred embodiments according to the present invention are described in reference to the drawings. FIG. 1 shows, along with adjacent oil passages, a hydraulic valve according to the present invention as first and second embodiments applied as a regulator valve for a transmission used in a vehicle. FIGS. 2A and 2B are enlarged views of the regulator valve. FIG. 2A shows the condition of the regulator valve where the spool to be described below in detail is shifted a little rightward from its leftmost position, and FIG. 2B shows the condition where the spool is shifted further rightward from the condition shown in FIG. 2A. While FIG. 3 is a sectional view taken along line III—III in FIG. 2A, FIG. 4 is an enlarged view of area IV in FIG. 2B, and FIG. 5 is an enlarged view of area V in FIG. 2B.

The regulator valve 10 comprises a valve body 20 and a spool 40, the valve body 20 having a spool-receiving room 21 whose inner surface is cylindrical, and the spool 40 being inserted and placed in the spool-receiving room 21. The spool-receiving room 21 comprises a first receiving room 21a and a second receiving room 21b, the first receiving room 21a having an inner diameter larger than that of the second receiving room 21b, which is located on the left side of the first receiving room 21a. The valve body 20 is also provided with five oil grooves 31, 32, 33, 34 and 35, which are formed perpendicular to the axis of the spool-receiving room 21 (the shape of the oil groove is shown in FIG. 3). The first oil groove 31 is located at the central part of the spool-receiving room 21 and connected to a pump oil passage L1, to which pressure oil is fed from a hydraulic pump (not shown), and to a main oil passage L2, to which the pressure oil adjusted by this regulator valve 10 is discharged.

The second oil groove 32 is located on the left side of the first oil groove 31 and connected to a lubrication oil passage L3, which is connected to a lubricating oil supply circuit (not shown). The third oil groove 33 is located at the right end of the second receiving room 21b and connected to a feedback oil passage L4 branched from the main oil passage L2. The fourth oil groove 34 is located at the right side part of the first receiving room 21a and connected to a regulator-pressure setting pressure supply oil passage L5, which leads to a regulator-pressure setting circuit (not shown). The fifth oil groove 35 is located at the left end of the spool-receiving room 21 and connected to a drain oil passage L6, which leads to an oil tank (not shown), in this embodiment. Depending on a requirement, this oil groove may be connected to another oil passage.

The spool 40 comprises centrally located right and left lands 42 and 41, whose diameter is relatively large, and between these lands 41 and 42, a passage 44 is provided as a connection passage for hydraulic oil. These lands 41 and 42 and the passage 44 are positioned in the first receiving room 21a. In this condition, part of the right-side land 42 is located in the first oil groove 31 while part of the passage 44 is located in the second oil groove 32. The spool 40 further comprises a rod portion 43 which is provided on the left side of the left-side land 41 and whose outer diameter is smaller than that of the lands 41 and 42. The rod portion 43 is located in the second receiving room 21b (also partially in the third oil groove 33). The spool 40 includes a spring-mounting room 47 at the right end, where a spring S is placed in compressed condition to always bias the spool 40 leftward.

As shown in FIGS. 2A and 2B and FIG. 4, the spool 40 is provided with a stepped down groove 53 around the rod portion 43 facing the third oil groove 33. The width of the stepped down groove 53 is constant in the axial direction and is so wide that the axial ends 53a and 53b of the stepped down groove 53 are located axially outside of the axial ends 33a and 33b of the third oil groove 33 at least while the regulator valve is set in pressure-adjusting condition (i.e., while the spool 40 is at a position in the spool-receiving room 21 where it is returned a little from the full stroke or leftmost end). As shown in FIGS. 2A and 2B and FIG. 5, the spool 40 is provided also with a stepped down groove 52 around the land 42 facing the first oil groove 31. The stepped down groove 52 is so positioned on the spool 40 that the axial ends 52a and 52b of the stepped down groove 52 having a constant width axially come, respectively, to the right and left sides of the axial end 31b of the first oil groove 31 (in this example) when the spool 40 shifts (rightward in this example) to increase the opening of the valve body 20 at least while the regulator valve is in pressure-adjusting condition. These stepped down grooves 52 and 53 are to eliminate the possibility of unbalanced loads that may otherwise act on the spool 40, unbalanced loads being generated because of the existence of drafts on the oil grooves 31 and 33 from the molding process (this function of the stepped down grooves is described in detail, later).

The third oil groove 33, which is connected to the feedback oil passage L4 branched from the main oil passage L2 as described above, receives the pressure oil from the main oil passage L2. Therefore, the spool 40 receives a rightward force that is generated by the pressure of the oil in the main oil passage L2, which pressure is supplied in the third oil groove 33. When this rightward force increases correspondingly to the increase of the pressure being received in the third oil groove 33, the spool 40 shifts rightward overcoming the leftward biasing force of the spring S and the leftward biasing force generated by the regulator-pressure setting pressure being supplied in the fourth oil groove 34 from the regulator-pressure setting pressure supply oil passage L5.

While the hydraulic pump is not operated, the first oil groove 31 does not receive pressure oil, so the main oil passage L2 does not receive pressure oil, either. In this condition, as the third oil groove 33 as well as the fourth oil groove 34 does not receive pressure oil, the spool 40 receiving only the leftward biasing force of the spring S is maintained stationary with the left end of the rod portion 43 being in contact to the left end inner wall of the fifth oil groove 35 (refer to FIG. 1).

When the operation of the hydraulic pump is started, the pressure oil from the hydraulic pump is supplied directly into the first oil groove 31 and then to the main oil passage L2. Immediately after the pressure oil has entered the main oil passage L2, it is led through the feedback oil passage L4 into the third oil groove 33. As a result, the spool 40 is shifted rightward connecting the first oil groove 31 and the second oil groove 32 through the passage 44 of the spool 40. In this condition, part of the oil in the pump oil passage L1 is led to the lubrication oil passage L3. The resultant condition now reduces the pressure of the main oil passage L2 and weakens the rightward biasing force acting on the spool 40, so the spool 40 is now shifted leftward. As the spool 40 shifts leftward, more part of the land 42 is positioned in the first oil groove 31, reducing the opening of the first oil groove 31. As a result, the flow of oil escaping to the lubrication oil passage L3 is reduced to increase the pressure of the main oil passage L2. As the pressure of the main oil passage L2 increases, the pressure of the third oil groove 33 also increases to shift the spool 40 rightward. As the spool 40 shifts rightward, less part of the land 42 is positioned in the first oil groove 31, increasing the opening of the first oil groove 31. Now, the flow of oil escaping to the lubrication oil passage L3 increases again, reducing the pressure of the main oil passage L2.

In this way, the regulator valve 10 is operated to control the pressure of the main oil passage L2 by the axial movement of the spool 40, which changes the axial length of the part of the land 42 staying in the first oil groove 31, thereby adjusting the opening of the first oil groove 31. While the spool 40 repeats axial movements as described above, it takes a position where an equilibrium is achieved among the leftward biasing force of the spring S, the rightward biasing force by the pressure oil supplied in the third oil groove 33, and the leftward biasing force by the pressure oil supplied in the fourth oil groove 34. As a result, the pressure of the main oil passage L2 or line pressure is maintained at constant. However, the regulator-pressure setting pressure being supplied into the fourth oil groove 34 through the regulator-pressure setting pressure supply oil passage L5 is set to a value higher than a normal value when the vehicle needs a large torque. When the regulator-pressure setting pressure at a higher value is supplied into the fourth oil groove 34, the pressure necessary for the spool 40 to shift rightward overcoming this increased pressure of the fourth oil groove 34, i.e., the pressure of the main oil passage L2, is increased to achieve a new equilibrium. In this way, the line pressure is increased.

By the way, the valve body 20 of the regulator valve 10 is an article of cast metal produced by die casting, so each of the above mentioned oil grooves 31, 32, 33, 34 and 35 and other oil grooves has a draft or slight taper, which is used for facilitating the removal of the die assembly during the production of the valve body. Because of the existence of a draft, the length of each oil groove in the axial direction of the spool 40 is smaller for the part of the oil groove located deeper in the valve body (part located lower in the drawing) and larger for the part located shallower. In the regulator valve 10, as described above, the rod portion 43 of the spool 40 facing the third oil groove 33 is provided with a stepped down, groove 53, which extends around the peripheral surface of the rod portion 43. Therefore, the oil in the third oil groove 33 flows into the stepped down groove 53 and surrounds and pushes the peripheral surface in the direction perpendicular to the axis of the spool 40 (in the upward and downward directions in the drawing). Because the axial ends 53a and 53b of the stepped down groove 53 are located axially outside of the axial ends 33a and 33b of the third oil groove 33 at least while the regulator valve is in pressure-adjusting condition as described above, the pushing force acting on the peripheral surface of the stepped down groove 53 is distributed evenly all around the peripheral surface. Therefore, no unbalanced force is generated around the peripheral surface, so the movement of the spool 40 is smoother than that of a prior-art counterpart. In addition, the valve body 20 is less prone to erosion than a prior-art counterpart because no or little unbalanced load acts to push the spool 40 onto the valve body 20.

Also, as described above, the land 42 of the spool 40 facing the first oil groove 31 is provided with a stepped down groove 52, which extends around the peripheral surface of the land 42. Therefore, the oil in the first oil groove 31 flows into the stepped down groove 52 and surrounds and pushes the peripheral surface in the direction perpendicular to the axis of the spool 40 (in the upward and downward directions in the drawing). Because the axial ends 52a and 52b of the stepped down groove 52 come, respectively, to the right and left sides of the axial end 31b of the first oil groove 31 to which end the spool 40 shifts to increase the opening of the oil groove at least while the regulator valve is in pressure-adjusting condition as described above, the pushing force acting on the peripheral surface of the stepped down groove is distributed evenly all around the peripheral surface. Therefore, no unbalanced force is generated around the peripheral surface, so the movement of the spool 40 is smoother than that of a prior-art counterpart. Accordingly, the valve body 20 is less prone to erosion than a prior-art counterpart because no or little unbalanced load acts to push the spool 40 onto the valve body 20.

In the above description, each of the stepped down grooves 52 and 53 is described to have a constant width in the axial direction. However, it is not necessary for each stepped down groove to have a constant width all around the spool 40. The same beneficial effect can be achieved by forming the stepped down grooves in an up-and-down symmetry in the cross-section of the spool 40. In this way, the areas of the stepped down grooves 52 and 53 to receive the pressure from the oil are made equal on the upper side and the lower side of the spool 40. Therefore, the same effect can be achieved in a case where notches are provided cross-sectionally symmetrically on the upper and lower sides of the axial ends of the stepped down groove 52, which faces the first oil groove 31, or the stepped down groove 53, which faces the third oil groove 33, for the purpose of reducing the ripple of the hydraulic pressure.

Figure 6:
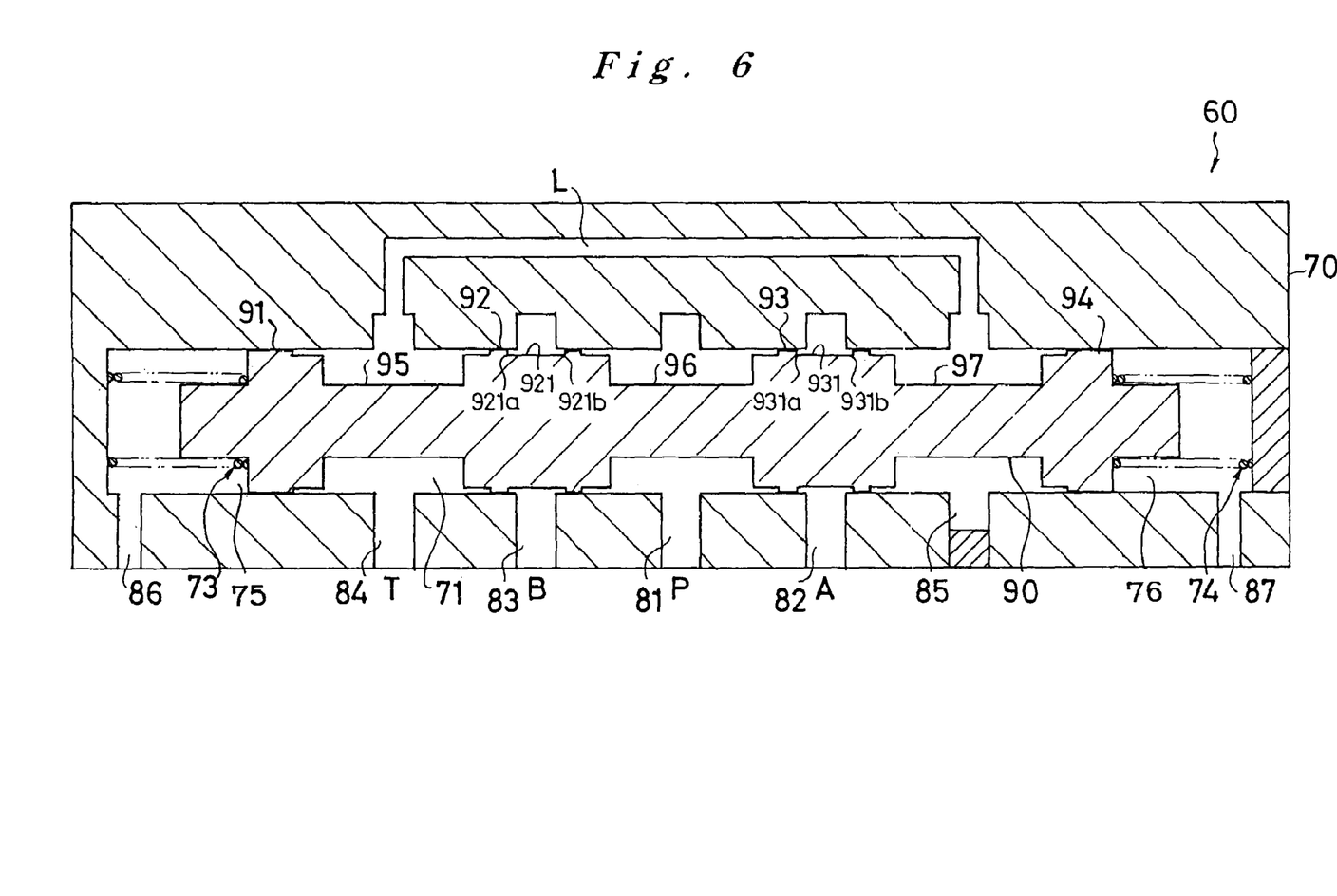
FIG. 6 shows a third embodiment of hydraulic valve according to the present invention applied as a directional control valve, the spool of the valve being positioned at a neutral position.
Figure 7:
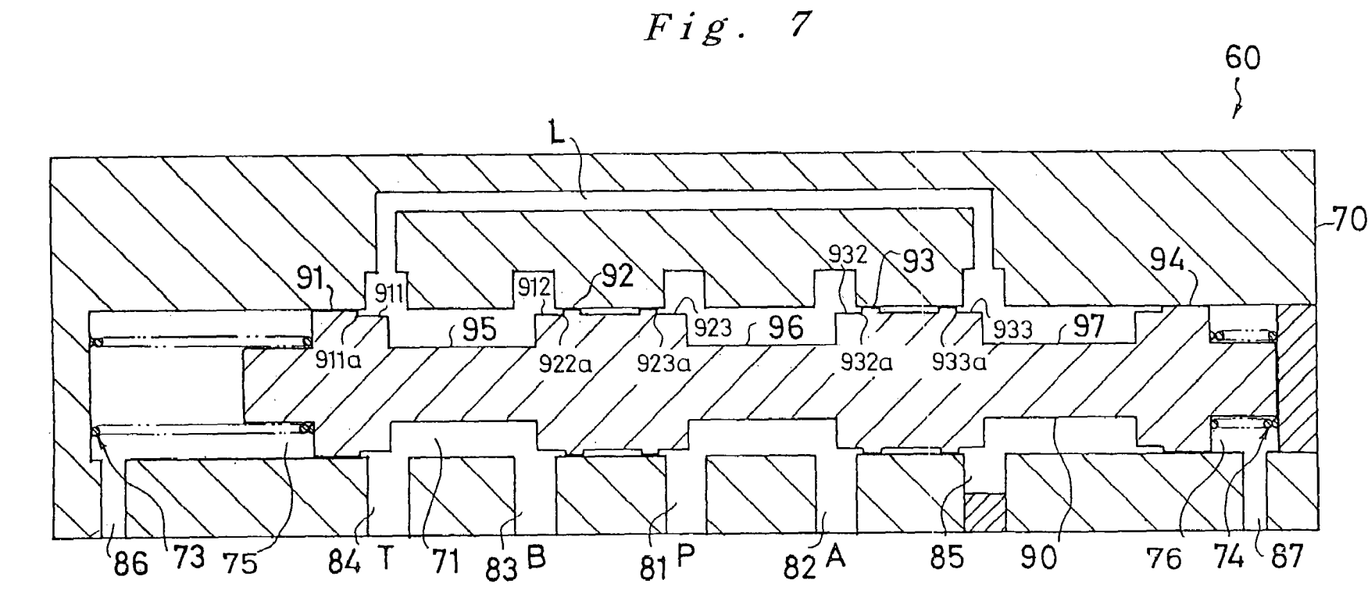
FIG. 7 shows this directional control valve, whose spool is positioned at a rightward switched position.
Figure 8:
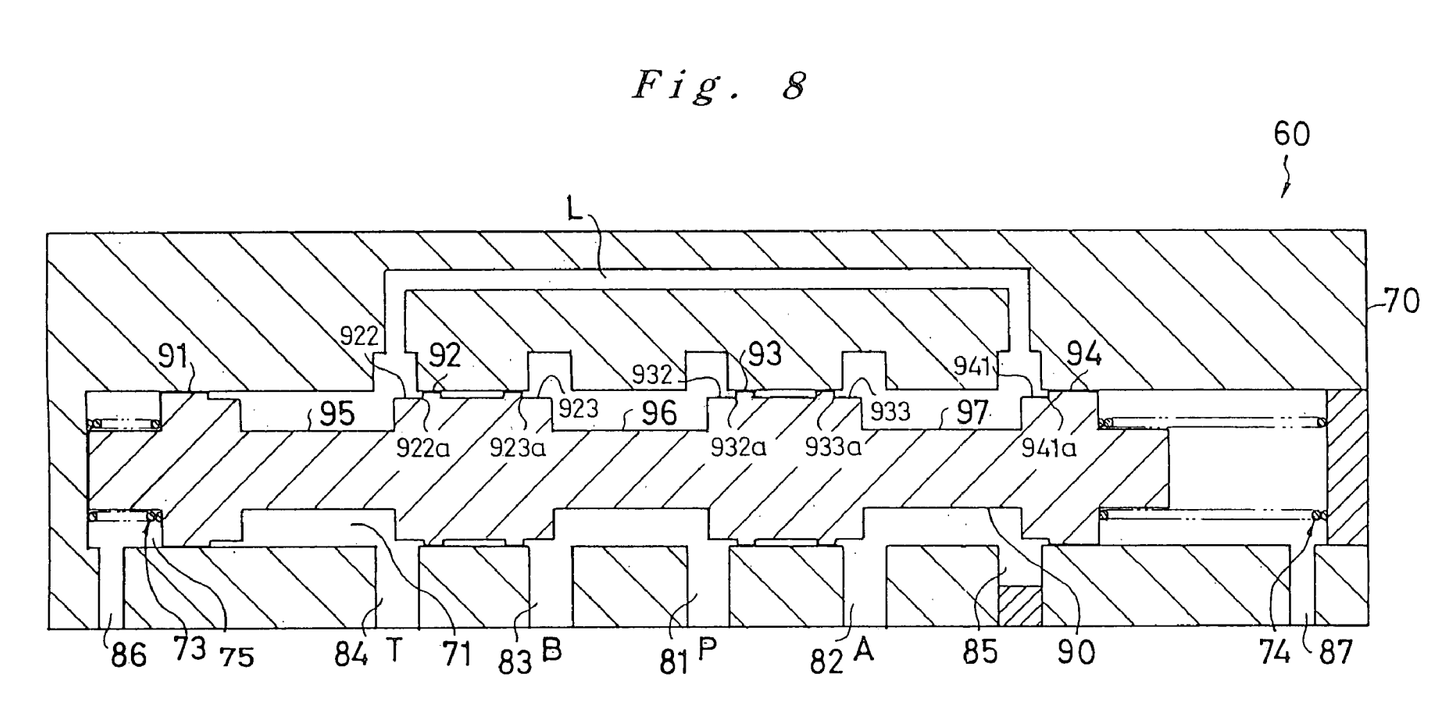
FIG. 8 shows the directional control valve, whose spool is positioned at a leftward switched position.

FIGS. 6, 7 and 8 show a third embodiment of hydraulic valve according to the present invention applied as a directional control valve. The directional control valve 60 comprises a valve body 70 and a spool 90, the valve body 70 having an internal spool-receiving room 71 whose inner surface is cylindrical, and the spool 90 being inserted and placed in the spool-receiving room 71. The valve body 70 is also provided with five oil grooves 81, 82, 83, 84 and 85, which are formed perpendicular to the axis of the spool-receiving room 71.

The first oil groove 81 is located at the central part of the spool-receiving room 71 and connected to P port where pressure oil is supplied from a hydraulic pump (not shown). The second oil groove 82 is located on the right side of the first oil groove 81 and connected to one of the ports (referred to as "A port") of a hydraulic actuator, for example, a hydraulic cylinder (not shown). The third oil groove 83 is located on the left side of the first oil groove 81 and connected to the other port (referred to as "B port") of the hydraulic actuator. The fourth oil groove 84 is located on the left side of the third oil groove 83 and connected to T port, which is connected to an oil tank (not shown). The fifth oil groove 85 is located on the right side of the second oil groove 82 and connected with the fourth oil groove 84 through an oil passage L.

The spool 90 comprises four lands 91, 92, 93 and 94 and three passages 95, 96 and 97, which are formed successively between the lands 91, 92, 93 and 94. The spool 90 is biased rightward by a biasing spring 73, which is provided at the left end of the spool-receiving room 71, and leftward by a biasing spring 74, which is provided at the right end. This directional control valve 60 is so designed that the spool 90 will take a neutral position as shown in FIG. 6 in the equilibrium achieved by these biasing springs 73 and 74 while no pressure oil is supplied through an oil passage 86 into an oil chamber 75 provided at the left end of the valve body 70 and through an oil passage 87 into an oil chamber 76 provided at the right end of the valve body 70. When the pressure oil is supplied into the oil chamber 75 through the oil passage 86 (with the oil chamber 76 at the right end being open to the oil tank), the rightward biasing force generated by the pressure acting on the spool 90, overcoming the leftward biasing force of the biasing spring 74, shifts and positions the spool 90 at a rightward switched position as shown in FIG. 7. On the other hand, when the pressure oil is supplied into the oil chamber 76 through the oil passage 87 (with the oil chamber 75 at the left end being open to the oil tank), the leftward biasing force generated by the pressure acting on the spool 90, overcoming the rightward biasing force of the biasing spring 73, shifts and positions the spool 90 at a leftward switched position as shown in FIG. 8.

In the directional control valve 60, when the spool 90 is positioned at the neutral position as shown in FIG. 6, the land 92 shuts the fluid communication routes between the first oil groove 81 and the third oil groove 83 and between the third oil groove 83 and the fourth oil groove 84, and the land 93 shuts the fluid communication routes between the first oil groove 81 and the second oil groove 82 and between the second oil groove 82 and the fifth oil groove 85. As a result, ports P, T, A and B are all blocked in the valve.

When the spool 90 is positioned at the rightward switched position as shown in FIG. 7, the land 92 shuts the fluid communication route between the first oil groove 81 and the third oil groove 83, and the land 93 shuts the fluid communication route between the second oil groove 82 and the fifth oil groove 85. However, the third oil groove 83 and the fourth oil groove 84 are in fluid communication to each other through the passage 95, and the first oil groove 81 and the second oil groove 82 are in fluid communication to each other through the passage 96. In this condition, ports P and A are in fluid communication to each other while ports B and T are in fluid communication to each other. As a result, the hydraulic actuator connected to the directional control valve 60 is actuated in a direction which corresponds to the flow of oil through these ports.

On the other hand, when the spool 90 is positioned at the leftward switched position as shown in FIG. 8, the land 92 shuts the fluid communication route between the third oil groove 83 and the fourth oil groove 84, and the land 93 shuts the fluid communication route between the first oil groove 81 and the second oil groove 82. However, the first oil groove 81 and the third oil groove 83 are in fluid communication through the passage 96, and the second oil groove 82 and the fifth oil groove 85 are in fluid communication through the passage 97. In this condition, ports P and B are in fluid communication to each other while ports A and T are in fluid communication to each other. As a result, the hydraulic actuator is actuated in the direction opposite to the previous direction.

Furthermore, as shown in FIG. 6, the spool 90 is provided with a stepped down groove 931 around the peripheral surface of the land 93, which faces the second oil groove 82 when the spool 90 is positioned at the neutral position. The stepped down groove 931 is so positioned that the axial ends 931a and 931b of the stepped down groove 931 having a substantially constant width axially are, respectively, outside of the second oil groove 82 in this condition. The spool 90 is provided also with a stepped down groove 921 around the peripheral surface of the land 92, which faces the third oil groove 83. This stepped down groove 921 is so positioned that the axial ends 921a and 921b of the stepped down groove 921 having a substantially constant width axially are, respectively, outside of the third oil groove 83 at this neutral position.

Moreover, as shown in FIG. 7, another stepped down groove 923 is provided around the peripheral surface of the land 92, which faces the first oil groove 81 when the spool 90 is positioned at the rightward switched position. This stepped down groove 923 is so positioned that the axial end 923a of the stepped down groove 923 having a substantially constant width axially is outside of the first oil groove 81 in this condition. Furthermore, another stepped down groove 932 is provided around the peripheral surface of the land 93, which faces the second oil groove 82. This stepped down groove 932 is so positioned that the axial end 932a of the stepped down groove 932 having a substantially constant width axially is outside of the second oil groove 82 in this condition. In addition, another stepped down groove 922 is provided around the peripheral surface of the land 92, which faces the third oil groove 83, and this stepped down groove 922 is so positioned that the axial end 922a of the stepped down groove 922 having a substantially constant width axially is outside of the third oil groove 83 in this condition. Yet another stepped down groove 911 is provided around the peripheral surface of the land 91, which faces the fourth oil groove 84, and this stepped down groove 911 is so positioned that the axial end 911a of the stepped down groove 911 having a substantially constant width axially is outside of the fourth oil groove 84 in this condition. Still another stepped down groove 933 is provided around the peripheral surface of the land 93, which faces the fifth oil groove 85, and this stepped down groove 933 is so positioned that the axial end 933a of the stepped down groove 933 having a substantially constant width axially is outside of the fifth oil groove 85 in this condition.

As shown in FIG. 8, the spool 90 is provided also with another stepped down groove 932 around the peripheral surface of the land 93, which faces the first oil groove 81 when the spool 90 is positioned at the leftward switched position. This stepped down groove 932 is so positioned that the axial end 932a of the stepped down groove 932 having a substantially constant width axially is outside of the first oil groove 81 in this condition. Furthermore, another stepped down groove 933 is provided around the peripheral surface of the land 93, which faces the second oil groove 82, and this stepped down groove 933 is so positioned that the axial end 933a of the stepped down groove 933 having a substantially constant width axially is outside of the second oil groove 82 in this condition. In addition, another stepped down groove 923 is provided around the peripheral surface of the land 92, which faces the third oil groove 83, and this stepped down groove 923 is so positioned that the axial end 923a of the stepped down groove 923 having a substantially constant width axially is outside of the third oil groove 83 in this condition. Yet another stepped down groove 922 is provided around the peripheral surface of the land 92, which faces the fourth oil groove 84, and this stepped down groove 922 is so positioned that the axial end 922a of the stepped down groove 922 having a substantially constant width axially is outside of the fourth oil groove 84 in this condition. Still another stepped down groove 941 is provided around the peripheral surface of the land 94, which faces the fifth oil groove 85, and this stepped down groove 941 is so positioned that the axial end 941a of the stepped down groove 941 having a substantially constant width axially is outside of the fifth oil groove 85 in this condition.

Also, the valve body 70 of the directional control valve 60 is an article of cast metal produced by die casting, so each of the above mentioned oil grooves 81, 82, 83, 84 and 85 has a draft or slight taper, which is used for facilitating the removal of the die assembly during the production of the valve body. Because of the existence of a draft, the length of each oil groove in the axial direction of the spool 90 is smaller for the part of the oil groove located deeper in the valve body (part located lower in the drawing) and larger for the part located shallower. In the directional control valve 60, the spool 90, which is positioned at the switched positions (including the neutral position), is provided with the stepped down grooves 911, 921, 922, 923, 931, 932, 933 and 941 that extend around the peripheral surfaces of the lands 91, 92, 93 and 94, respectively, which face the oil grooves 81, 82, 83, 84 and 85 as described above. Therefore, the oil in the oil grooves flows into the corresponding stepped down grooves and surrounds and pushes the peripheral surfaces in the direction perpendicular to the axis of the spool 90 (in the upward and downward directions in the drawing). Because the axial ends of the stepped down grooves are located axially outside of the corresponding oil grooves at the switched positions, the pushing force acting on the peripheral surface of each stepped down groove is distributed evenly all around the peripheral surface. Therefore, no unbalanced force is generated around the peripheral surface, so the movement of the spool 90 is smoother than that of a prior-art counterpart. In addition, the valve body 70 is less prone to erosion than a prior-art counterpart because no or little unbalanced load acts to push the spool 90 onto the valve body 70.

In the above described directional control valve 60, a hydraulic pilot control is used to shift the spool 90 axially. Instead, an electromagnetic drive may be applied, or the spool 90 may be shifted manually or mechanically. Also, instead of the hydraulic pilot control, the driving method used for shifting the spool 40 in the previously described regulator valve 10 may be also applied for shifting the spool 90 in the directional control valve 60. In this case, part of the first embodiment is applicable to the directional control valve.

In the above description, each of the stepped down grooves 911, 921, 922, 923, 931, 932, 933 and 941 is described to have a substantially constant width in the axial direction. However, it is not necessary for each stepped down groove to have a constant width all around the spool 90. As in the case of the regulator valve 10 described previously, the same beneficial effect can be achieved by forming the stepped down grooves in an up-and-down symmetry in the cross-section of the spool 90. Therefore, the same effect can be achieved in a case where notches are provided cross-sectionally symmetrically on the upper and lower sides of the axial ends of the stepped down grooves 911, 921, 922, 923, 931, 932, 933 and 941.

Preferred embodiments of hydraulic valve according to the present invention are described above. However, the scope of the present invention is not limited to those embodiments. In the above description, the first and second embodiments of hydraulic valve according to the present invention are applied to a regulator valve. These are only examples. The same embodiments may be applied to a reducing valve, to a directional control valve or to a flow-control valve.

In the above embodiments, stepped down grooves are provided around the peripheral surfaces of the spool to eliminate unfavorable effects of drafts remaining on the inner surfaces of the oil grooves, which are formed by molding. However, unbalanced loads may occur from reasons other than oil grooves with slight tapers. For example, oil grooves whose inner surfaces are not finished to an adequate precision can cause unbalanced loads to act on the spool. In such a case, stepped down grooves are also applied to eliminated the problem.

As described above, in the first embodiment of hydraulic valve according to the present invention, a stepped down groove is provided around the peripheral surface of the spool, so that the stepped down groove faces the oil groove. In this arrangement, oil in the oil groove flows into the stepped down groove and pushes the peripheral surface in the direction perpendicular to the axis of the spool. Because the axial ends of the stepped down groove are located axially outside of the axial ends of the oil groove at least while the hydraulic valve is in pressure-adjusting condition, the pushing force acting on the peripheral surface of the stepped down groove is distributed evenly all around the peripheral surface. Therefore, no unbalanced force is generated around the peripheral surface, so the movement of the spool is smoother than that of a prior-art counterpart. In addition, the valve body is less prone to erosion than a prior-art counterpart because no or little unbalanced load acts to push the spool onto the valve body.

In the second embodiment of hydraulic valve, a stepped down groove is provided around the peripheral surface of the spool, so that the stepped down groove faces the oil groove. In this arrangement, oil in the oil groove flows into the stepped down groove and pushes the peripheral surface in the direction perpendicular to the axis of the spool. Because the axial ends of the stepped down groove come axially to the right and left sides, respectively, of the axial end of the oil groove to which end the spool shifts to increase the opening of the oil groove at least while the valve is in pressure-adjusting condition, the pushing force acting on the peripheral surface of the stepped down groove is distributed evenly all around the peripheral surface. Therefore, no unbalanced force is generated around the peripheral surface, so the, movement of the spool is smoother than that of a prior-art counterpart. In addition, the valve body is less prone to erosion than a prior-art counterpart because no or little unbalanced load acts to push the spool onto the valve body.

In the third embodiment of hydraulic valve according to the present invention, a stepped down groove is provided around the peripheral surface of a land of the spool, so that the stepped down groove faces the oil groove when the spool is positioned at each switched position. In this arrangement, oil in the oil groove flows into the stepped down groove and pushes the peripheral surface in the direction perpendicular to the axis of the spool. Because the axial end of the stepped down groove comes axially outside of the oil groove when the spool is at any switched position, the pushing force acting on the peripheral surface of the stepped down groove is distributed evenly all around the peripheral surface. Therefore, no unbalanced force is generated around the peripheral surface, so the movement of the spool is smoother than that of a prior-art counterpart. In addition, the valve body is less prone to erosion than a prior-art counterpart because no or little unbalanced load acts to push the spool onto the valve body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-345254 filed on Nov. 9, 2001, which is incorporated herein by reference.

What is claimed is:

1. A hydraulic valve comprising:
a valve body which has an internally cylindrical spool-receiving room and an oil groove provided orthogonally to an axis of said spool-receiving room, and
a spool, which is inserted in said spool-receiving room; wherein:
said spool is shifted axially in correspondence to an actuation pressure being supplied into said oil groove;

said oil groove has a draft which facilitates the removal of the die assembly;

a stepped down groove is provided around a peripheral surface of said spool that faces said oil groove, so that a hydraulic pressure supplied into said oil groove is made to act on said spool at said stepped down groove so as to eliminate possibility of an unbalanced load acting on said spool in a direction perpendicular to an axis of said spool; and both axial ends of said stepped down groove are located axially outside of both axial ends of said oil groove at least while said hydraulic valve is in pressure-adjusting condition.

2. The hydraulic valve as set forth in claim 1, wherein:

said stepped down groove is formed in a cylindrical tube figure, coaxially to said spool; and lateral faces of said stepped down groove are orthogonal to the axis of the said spool.

3. The hydraulic valve as set forth in claim 1, wherein:

said spool is axially shifted to change axial length of part of a land that is axially in said oil groove so as to adjust opening of said oil groove;

said stepped down groove is provided on a peripheral surface of said land; and both axial ends of said stepped down groove come axially outside right and left sides, respectively, of the axial ends of said oil groove located on a side to which said spool shifts to increase said opening, at least while said hydraulic valve is in pressure-adjusting condition.

4. The hydraulic valve as set forth in claim 1, wherein:

said spool is axially shifted to switch positions, so that said oil groove is communicated and blocked in correspondence to the switched positions;

said stepped down groove is provided on a peripheral surface of a land of said spool that faces said oil groove when said spool is positioned at each switched position; and an axial end of said stepped down groove is axially outside of said oil groove notwithstanding the switched position of said spool.

5. A hydraulic valve comprising:

a valve body, which has an internally cylindrical spool-receiving room and an oil groove provided orthogonally to an axis of said spool-receiving room, and a spool, which is inserted in said spool-receiving room; wherein:

said spool is shifted axially by feeding pressure of an oil passage connected to said spool-receiving room back through said oil groove;

the pressure of said oil passage is controlled by axial shift of said spool;

a stepped down groove is provided around a peripheral surface of said spool that faces said oil groove; and both axial ends of said stepped down groove are located axially outside of both axial ends of said oil groove at least while the pressure in said oil passage is controlled.

6. A hydraulic valve comprising:

a valve body, which has a cylindrical spool-receiving room and an oil groove provided orthogonally to an axis of said spool-receiving room, and a spool, which is inserted in said spool-receiving room; wherein:

said spool is axially shifted to change axial length of part of a land that is axially in said oil groove, so as to adjust opening of said oil groove and to control pressure of an oil passage connected to said spool-receiving room;

a stepped down groove is provided on a peripheral surface of said land; and both axial ends of said stepped down groove come axially outside right and left sides, respectively, of the axial ends of said oil groove located on a side to which said spool shifts to increase said opening, at least while the pressure of said oil passage is controlled.

7. A hydraulic valve comprising:

a valve body, which has a cylindrical spool-receiving room and oil grooves provided orthogonally to an axis of said spool-receiving room, and a spool, which is inserted in said spool-receiving room; wherein:

said spool is axially shifted between neutral position and switched position;

said oil grooves are communicated and blocked in correspondence to the position of said spool;

a stepped down groove is provided on a peripheral surface of a land of said spool that faces said oil grooves when said spool is positioned at neutral position; and an axial end of said stepped down groove is axially outside of said oil grooves when said spool is positioned at neutral position.

* * * * *